United States Patent Office 3,517,112
Patented June 23, 1970

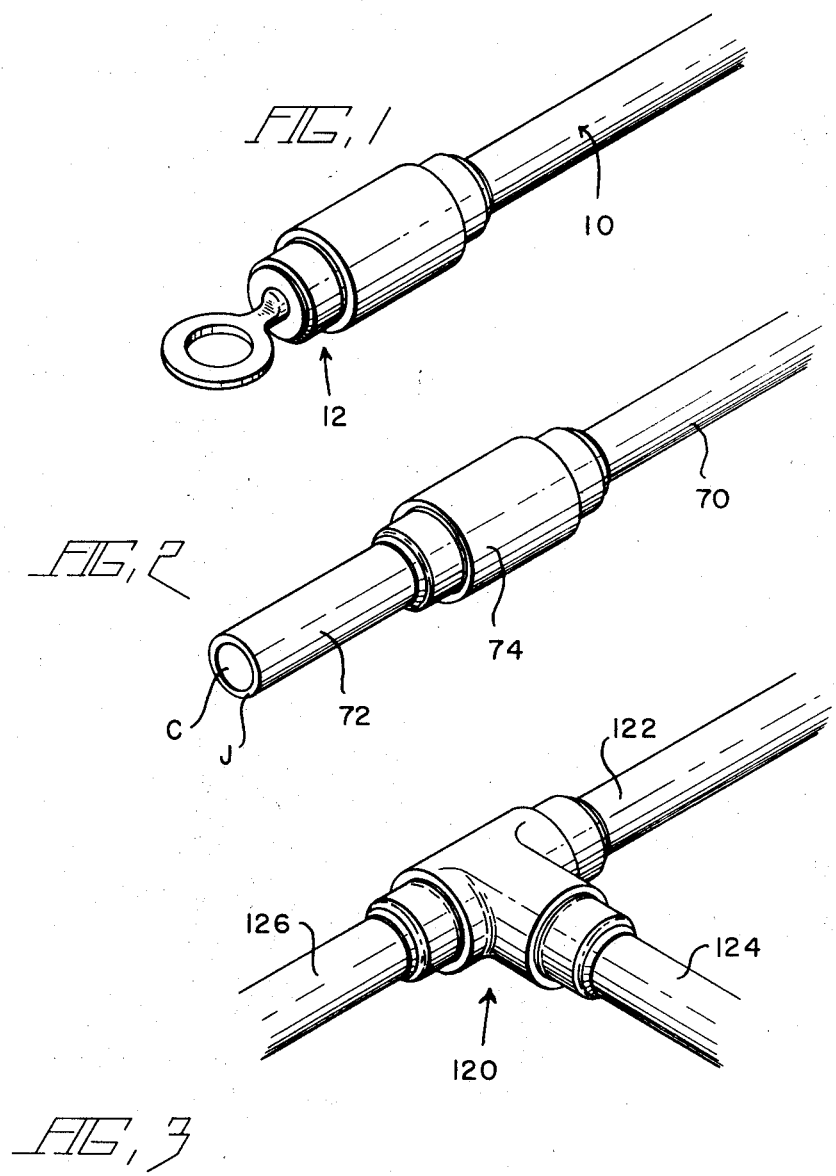

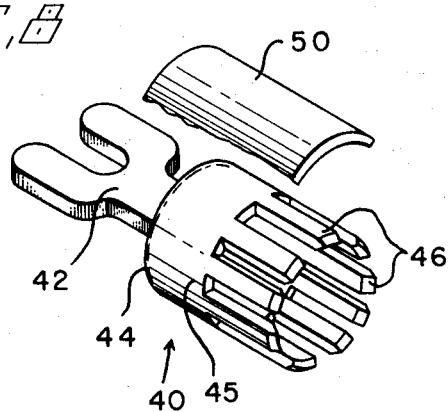
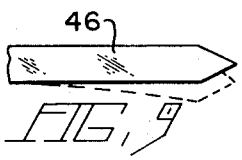
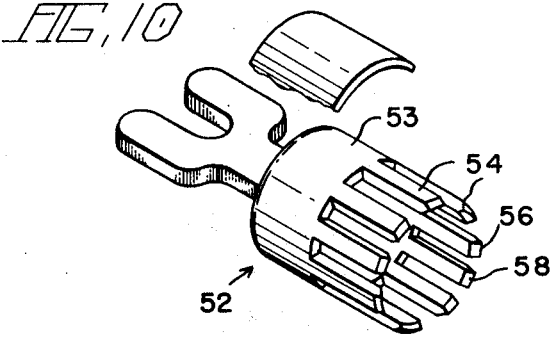
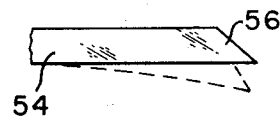
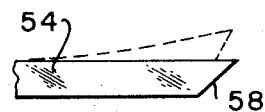
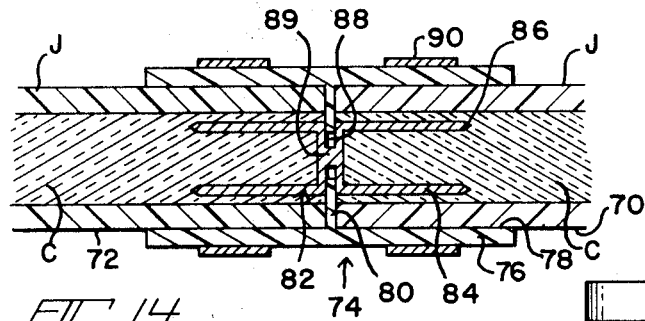
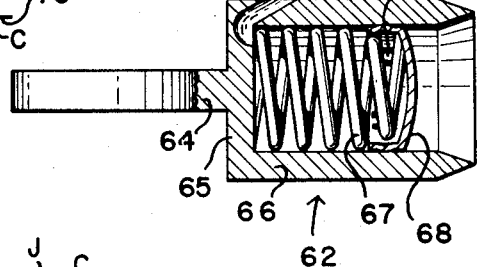
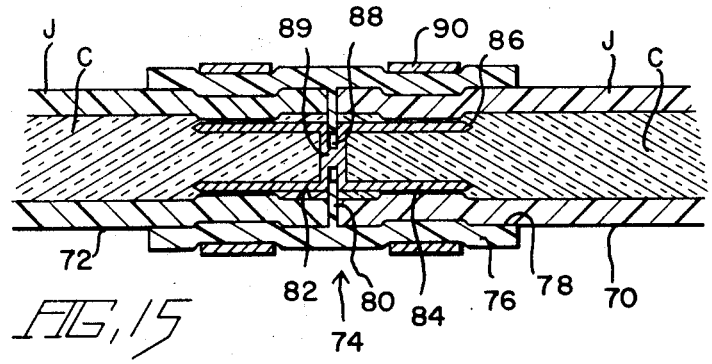

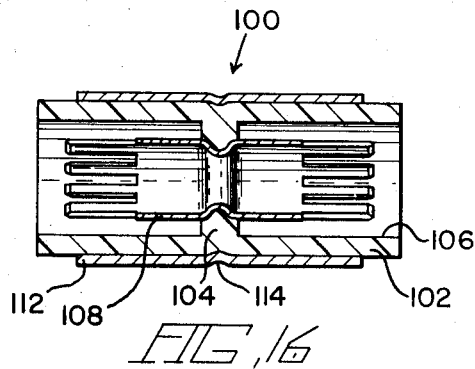
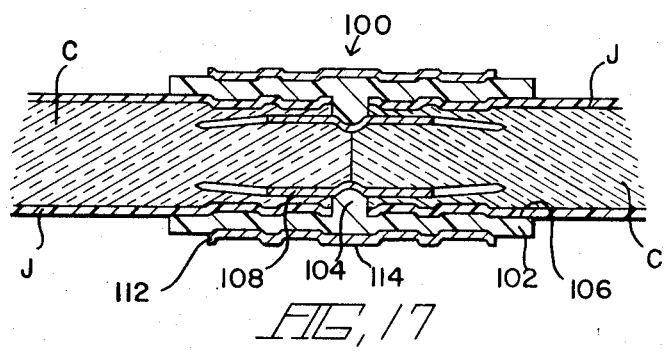
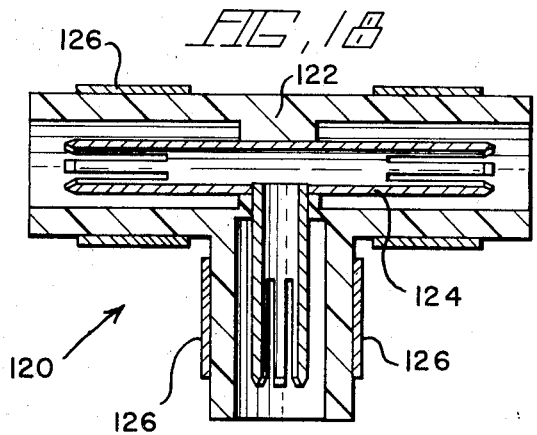

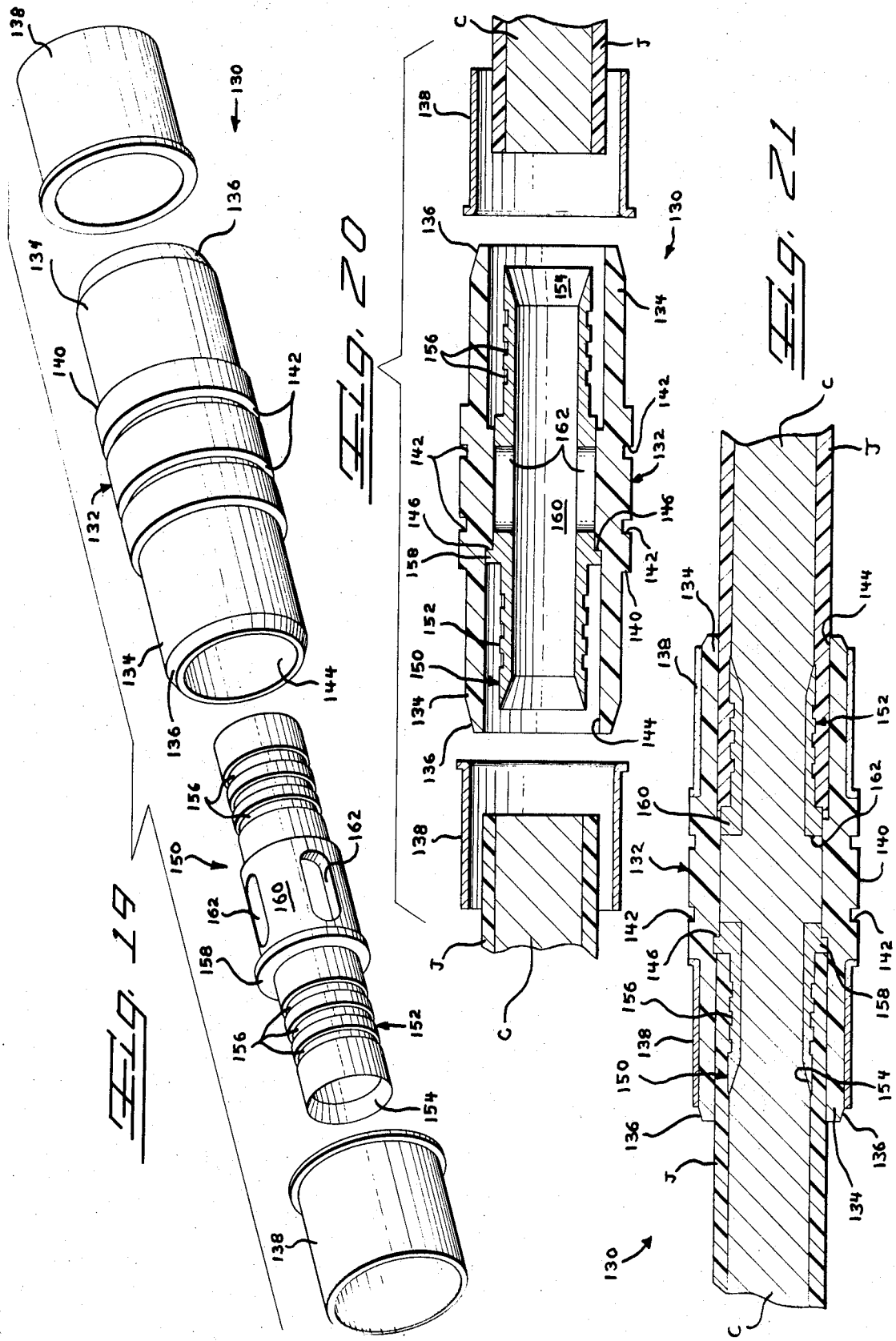

3,517,112
ELECTRICAL TERMINAL CONNECTOR FOR SODIUM CABLE
Frederick William Wahl, Middletown, Pa., assignor to AMP Incorporated, Harrisburg, Pa.
Continuation-in-part of application Ser. No. 564,798, July 13, 1966. This application Sept. 6, 1967, Ser. No. 665,835
Int. Cl. H01r 5/10; 11/20
U.S. Cl. 174—75                        17 Claims

ABSTRACT OF THE DISCLOSURE

A connector for sodium-like cable is disclosed which features a housing of insulating material telescoped over the end of cable. The housing carries a center conductive structure including a thin metal sleeve member having a sharp leading edge adapted to cut into the conductive material of the cable and permit the device to be manually installed on a cable end. The sleeve member serves to provide back-up against forces developed by a metallic crimping or clamping ferrule applied over the outside of the housing. The sleeve member is in one version made to include spring portions loaded radially by insertion of the member into cable and/or by the deformation resulting from the application of the ferrule. In another version the sleeve member includes spring portions loaded axially upon insertion of the member into the cable. In all versions the crimping or clamping ferrule is separated from the sleeve member by the insulating housing to minimize heating of the ferrule by conduction from the interface between the sleeve member and the cable.

---

This case is a continuation-in-part of my prior application, Ser. No. 564,798, filed July 13, 1966, now abandoned and to which priority is asserted as to subject matter common therewith.

BACKGROUND OF THE INVENTION

A number of electrical cables have been introduced which utilize a sodium alloy as a cable conductive material. The conductive material is held within a relatively thick insulating and protective sleeve typically made of polyethylene. The advantages of cable of this type are principally related to the ease of forming such as by extrusion and to overall economics relative to cost of material; the sodium alloy of use being considerably less expensive than either copper or aluminum in the alloys typically used for electrical cable.

The problems with sodium filled cable are substantial. In addition to the usual problem of providing a mechanical connection between the cable and the particular device of use there is a problem with sealing and protecting the conductive material against normal environment. This is because sodium is not stable in a normal atmosphere and reacts considerably in the presence of air and particularly in the presence of water or moisture. Because of this, it is necessary that a connection with a cable made with unstable material such as sodium be thoroughly sealed. Still another problem with sodium-like materials as used in electrical cable is one of establishing interface between the sodium material and the brass or copper material, typically used in terminals, connectors, splices, and the like. With respect to connections of a given device to copper or aluminum cable which is relatively hard the prior art approach is to deform some malleable portion of the device against the copper or aluminum conductive material to an extent to cause inelastic deformation to provide an interface therebetween held by the relatively hard metallic portions of the deformed members; i.e., to crimp down on the device against the conductor. With relatively soft materials such as sodium alloys, there is no substantial resistance to deformation in the same sense as with copper or aluminum.

There is still a further problem concerning the interface which must be created to establish an electrical connection between sodium and the materials of connector devices. As soon as sodium materials is cut for providing a connection to a device, it immediately reacts to form a "skin" over all exposed surface area. This is true with respect to copper and aluminum but the very slight slight oxidation that results in those materials is an order of magnitude less than the reaction occurring when sodium is freshly cut and exposed to air.

Still another problem exists with respect to the seal which must be provided against the protective jacket housing the conductive material. The usual material employed is thermo-plastic which is subject to flow in the presence of either heat or pressure. This means that structures tending to compress the material to effect a seal may very well cause the material to flow in time to reduce the effectiveness of the seal. Alternatively, in use the seal may be destroyed by ambient heat or heat generated in the connector device due to loads applied thereto.

It is an object of the present invention to provide a connector device for electrical cable comprised of unstable conductive material having the general characteristics of sodium or sodium alloys.

It is another object of this invention to provide a connector device which is simple and inexpensive and yet which provides a permanently sealed and protected conductor interface with relatively soft conductive material of electrical cable having the characteristics of sodium or alloys thereof.

It is a particular object of the invention to provide an electrical connector device for use with electrical cable having a relatively soft conductive material which establishes and maintains a broad area of contact between the conductor portions of the device and of the cable.

It is still another object of the invention to provide an electrical connector device which incorporates means operable to provide a permanent residual spring pressure to maintain the interface between the device and a conductive material which is relatively soft.

It is yet a further object of the invention to provide an electrical connector device which is easily installed on electrical cable of the type having a soft and unstable conductive material like that of sodium or alloys thereof.

The present invention achieves the foregoing objectives by providing a connector device having a relatively thin sleeve member including a leading edge which is shaped to cut or bite into the soft conductive material of sodium filled cable so as to establish a broad area of contact and interface therewith and further to provide a back-up structure to permit crimping of the device onto the cable. In a terminal embodiment, the sleeve member is made to have joined thereto or integrally therewith a projecting and exposed portion of stable conductive material such as brass or copper to facilitate use of the device in a connection to the equipment served by the cable. In a splice embodiment, and adaptable for use in a T-embodiment, the sleeve member is made to extend through and into the conducting material of two or more cables joined thereby. There is provided for the various embodiments a plastic insulating and sealing structure which fits around the sleeve member and is crimped down over the outer insulating sheath of the cable by a metallic ferrule member. The sleeve member acts as a back-up to support the crimping forces applied to the ferrule to permanently grip the jacket of the cable between metallic portions and thus preclude flow of the jacket. The plastic member is sealed against the end of the sleeve in the terminal embodiment and includes a supporting structure for the splice embodiments. In all embodiments, the outer metallic ferrule is isolated from the inner metallic structure.

In alternative embodiments of the invention, the sleeve member is made to have spring characteristics so that upon insertion into the cable or upon crimping, portions thereof are loaded to exert a residual spring pressure holding the interface with the relatively soft conductive material during the life of the device, or at least until amalgamation has taken place.

In the drawings:

FIG. 1 is a perspective of a terminal embodiment of the invention;

FIG. 2 is a perspective of splice embodiment of the invenion;

FIG. 3 is a perspective of a T-splice embodiment of the invention;

FIG. 8 is a perspective showing portions of a terminal embodiment of the invention having one type of spring structure and spring action;

FIG. 9 is an enlarged view of the end of the spring structure of the embodiment of FIG. 8;

FIG. 10 is an alternative version of a terminal embodiment having a different spring structure;

FIGS. 11 and 12 are enlarged views of the spring structures incorporated in the embodiment of FIG. 10;

FIG. 13 is yet another embodiment incorporating a different spring structure for use with a terminal in accordance with the invention;

FIG. 14 is a sectional view of a splice embodiment of the invention prior to crimping;

FIG. 15 is a sectional view of the splice embodiment of FIG. 14 following crimping;

FIG. 16 is a sectional view of an alternative splice embodiment prior to crimping;

FIG. 17 is a longituidinal section of the embodiment of FIG. 16 following crimiping;

FIG. 18 is a longitudinal section of a T-splice embodiment incorporating aspects of the invention as shown in FIG. 16;

FIG. 19 is a perspective view of a splice embodiment in another embodiment;

FIG. 20 is a sectional view of the device of FIG. 19 prior to connection; and

FIG. 21 is a longitudinal sectional view following connection.

Figure 4:
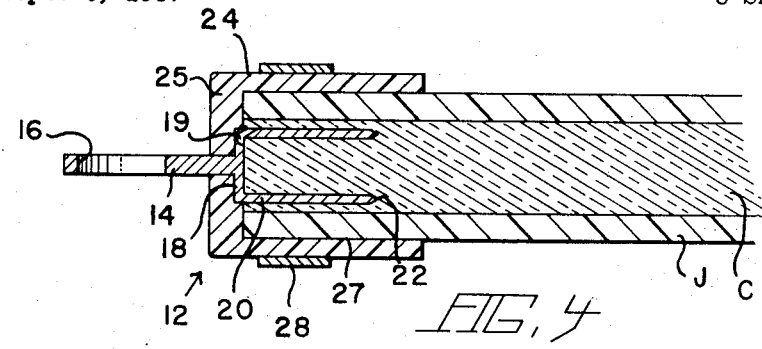
FIG. 4 is a longitudinal section of the terminal embodiment prior to crimping.

Turning now to FIGS. 1–3, the invention in three physical forms of connection is shown relative to a terminal 12 for terminating a cable 10; a splice 74 for joining cables 70 and 72; and a T-trap or splice 120 for joining the three cables 122, 124, and 126. The terminal in FIG. 1 is essentially a mechanical and electrical connection of a cable including a conductive material having the characteristics of sodium to a more stable material such as brass or copper. It is to be understood that by utilizing the general structure to be detailed relative to FIG. 1, a variety of connector devices may be developed wherein the forward and stable brass or copper portion may be made in a variety of geometrics for intermating with similar portions on another connector half. The splice embodiment 74 represents a joining of two cables having sodium-like conductive material therein and the T-splice embodiment is for a similar purpose. In brief summary, the terminal embodiment is for joining unstable sodium-like conductive material of a cable to a stable conductive material and the splice embodiments are for joining together masses of unstable material in two or more cables.

All of the embodiments herein to follow accomplish a mechanical connection of the particular device to the cable, an electrical connection to or between cable material and finally a sealed connection which protects the unstable material in the cable and also protects the interface created by the device.

The cable being presently manufacture to incorporate a sodium-like alloy, includes a center core C covered by a jacket J as shown in FIG. 2 and is shown in more detail in following figures. The conductive material C is light in weight as compared with copper, having the general consistency of refrigerated butter at normal temperatures. The consistency and density of material C is such that one can quite easily penetrate the material to a considerable depth with a sharpened instrument without the aid of mechanical advantage. In a test wherein a quarter inch flat faced indentor rod was inserted into a block of pure sodium to a depth of a little less than a half inch, the insertion force was between 10 and 12 lbs. at 10° F. At 32° F. this same test required only about 18 lbs. insertion force. The jacket J utilized to encase or house and to seal the conductive materials C is relatively thick as compared to most sheathing used to cover electrical conductive material such as copper and is in a preferred embodiment made of polyethylene extruded in tubing simultaneously with the extruding of the sodium.

In the uses contemplated, both overhead and underground, the cable is dimensioned such that the sodium or sodium-like alloy user conduction will not be intentionally heated to a degree to go into the liquid state. This is some point of concern since pure sodium goes from a solid state to a liquid state at approximately 208° F. One reason for avoiding this is that the polyethylene sheathing typically used begins to soften up at the melting point of sodium and the sodium changes its resistance quite drastically at is goes from solid to liquid and continues to change as the temperature exceeds 208° F. This change is an increase in resistance which is undesirable for power and signal applications.

Figure 5:
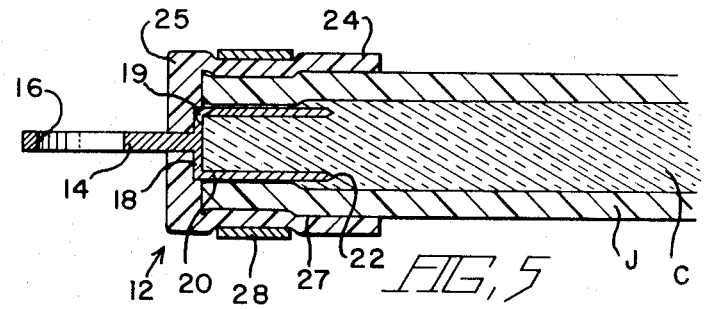
FIG. 5 is a longitudinal section of the terminal embodiment following crimping.

Turning now to FIG. 4 and to the details of the terminal embodiment of the invention shows an 12, the connection portion of the device is shown as 14 to include an aperture 16 which may be connected to the equipment service served by the cable. The cable, fitted with the terminal, may be attached to a terminal or switch block or other equipment by bolt passing through the aperture 16 and clamping the terminal to a conductive strip. The portion 14 is made of a stable conductive material such as brass. At the inner end of 14, there is an adjoining portion 18 which may be made integral or fastened thereto in any suitable fashion. Connected to 18 is a sleeve 20 made of conductive material either integral with 18 or fastened thereto in a suitable manner. The sleeve 20 is made to have a length which is appreciable related to the diameter of the cable and preferably greater than the diameter of the conductive materials C shown in the figure so as to form a broad area of contact therewith. Sleeve 20 is further made to be of a relatively thin wall thickness and to have a sharpened or beveled leading edge shown as at 22 to facilitate insertion to the conductive material C. The outer diameter of 20 may range between a diameter wherein insertion of 20 within the end of the clabe cleaves the conductive material C from the inner diameter of J down to a diameter wherein 20 may be positioned as shown in FIG. 4 well within the body of the conductive material C. It may in certain applications be even smaller. One of the features contemplated by the invention is to make the diameter of 20 sufficiently large relative to the diameter of the cable to reduce the amount of deformation which must be imparted to the outer crimping ferrule. The sleeve 20 must also therefore have characteristics which serve to provide a resistance to crimping forces imparted to the material between the sleeve and the outer crimping ferrule. This control of required deformation of the outer ferrule is shown in FIG. 5 which reveals portions of the cable and the terminal to be compressed and portions of the conductive material C to be compressed and extruded. Surrounding and positioning 14, 18 and 20 is a member shown as 24 which is comprised of a plastic insulating material such as polyethylene. The forward end of 24 includes a thickened wall area shown as 25 into which is fitted the shank of 14 and the forward face of 18. The engagement with 14 and 18 by 24 is made to seal the end of the cable. This may be accomplished by bonding by the use of adhesives which will link the surface of 14 and 18 to the material of 24 or by molding the member 24 onto the portions 14 and 18 of the conductive part of the terminal. Extending back from wall 25 is a tubular or sleeve like portion 27 which has a slightly reduced wall thickness relative to that of 25 and which has an inner diameter to slidingly fit over the outer diameter of J into the position shown in FIG. 4. The length of 27 is made to be appreciable relative to the diameter of J and is as shown preferably made to be greater than this diameter to provide a broad area of contact therewith for mechanical and sealing purposes. Fitted over the outside of 27 is a ferrule shown as 28 comprised of a malleable metallic material such as annealed copper. The ferrule 28 is relatively thin in its wall section to facilitate crimping under reasonable forces of deformation and to facilitate flow into a desired "O" configuration as taught in Re. 25,847 to E. W. Forney, granted Aug. 31, 1965. The wall thickness and material characteristics of 28 are also made to be such that the ferrule provides a permanent and relaxation resistance engagement with 27 following the crimping operation to compress 27 and in turn compress portions of J thereunder inwardly around the periphery to perfect a seal between the outside of J and the inside of 27 as indicated in FIG. 5. As heretofore mentioned the sleeve 20 serves as a backup member to receive and support the compressive loading of the materials between the outer surface of 20 and the inner surface of 28.

With the cable terminated as shown in FIG. 5 the conductive portions thereof are in broad contact with the conductive material C of the cable and the conductive material is sealed from escaping and from entry of air or moisture.

As a preferred construction of 24 and 28 and as a preferred technique to be utilized in providing the sealed structure, reference is made to copending U.S. application Ser. No. 517,747 filed Dec. 30, 1965, in the name of H. W. Demler, Sr., now U.S. Pat No. 3,378,282

Figure 6:
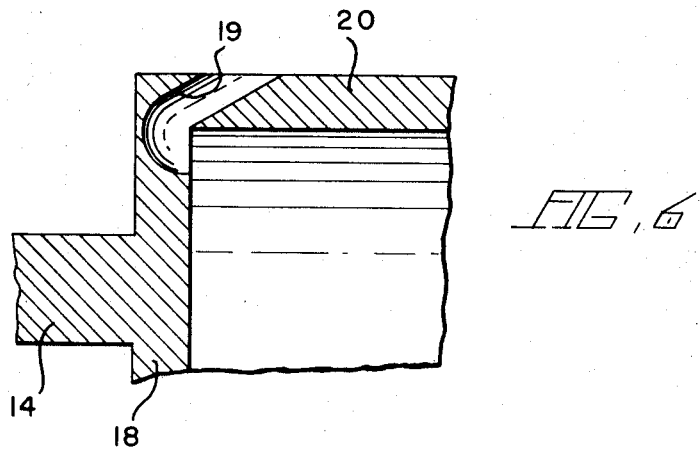
FIG. 6 is an enlarged detail of a portion of the terminal embodiment shown in FIGS. 1, 4, and 5.

Referring now to FIG. 6 a portion of the conductive part of the terminal shown in FIGS. 4 and 5 is enlarged to show in detail a port 19 which may be placed in the inner end of 18 and made to extend out through the forward end of 20 to relieve any air or gas trapped within 20 during the insertion of 14, 18 and 20 within the cable and into the conductive material C. The port 19 may be quite small as indicated and may be repeated about the periphery of 18 if necessary, depending upon the characteristics of the material. It is contemplated that in certain other embodiments ports such as 19 will not be necessary, as for example in instances where the length of 20 is made to be relatively short and is split along its length.

Figure 7:
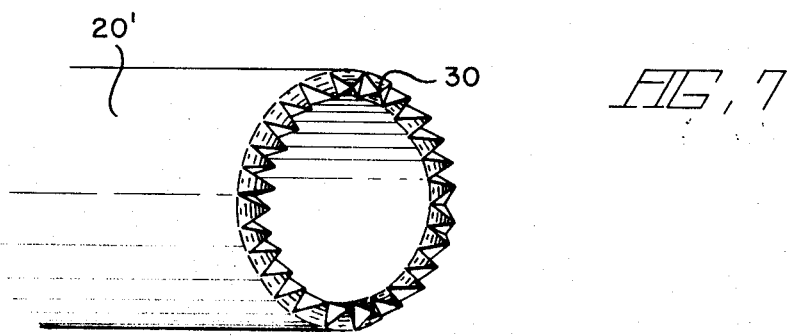
FIG. 7 is an alternative embodiment useful in conjunction with the sleeve member of the invention.

In FIG. 7 the sleeve of the terminal embodiment is shown as 20' and the forward leading edge is shown to be serrated as at 30. This feature is useful in facilitating insertion of the terminal structure which may be twisted onto the cable to cut or bite into the conductive material thereof. This feature may be necessary with certain types of conductive material which are more dense than pure sodium or with sodium alloys in uses wherein the expected application temperature is well below freezing.

The embodiment of FIGS. 4 and 5 is preferred if there is any practical clause that the cable conductive material may be so loaded as to become appreciably heated and approach the liquid state. In this regard all of the embodiments have a construction wherein the outer ferrule is not connected to but rather spaced from the conductive portion of the device. Because of this, heat generated in the cable is not conducted to the outside ferrule to thus place a heated metallic member on each side of the plastic of the housing and the jacket and cause a softening thereof and flow to destroy the seal of the device.

In FIG. 8 there is shown a terminal assembly with the outer insulating and sealing plastic portions removed for clarity. These portions would, of course, be included in an operable device and would be secured to portions shown in FIG. 8 in the same manner as shown in FIGS. 4 and 5. The terminal 40 includes conductive portions 42 adapted to be engaged by a terminal block or like device served by the cable of use and integral therewith a sleeve 44 which has a first solid portion 45 and extending therefrom a plurality of fingers 46. Sleeve 44 is typically made of brass and may be stamped, formed and rolled to the configuration shown or cut and broached from solid tubular material and then joined to the forward portion 42 as by brazing or in any other suitable fashion. The total length of 44 is thus comprised of a tubular portion and then a spring portion. In accordance with the embodiment of FIG. 8 the ferrule shown as 50 is made to extend over both of the portions 45 and 46. It is contemplated that the ferrule 50 may be crimped substantially along its length by a single crimp or may be crimped in two distinct segments. If the latter approach is used and this is generally preferred the first crimp is generally centered over the portion 45 and the second crimp is made over the outer parts of the spring fingers 46.

The crimp applied to ferrule 50 overlying the solid tubular portion of 44 is substantially identical to that shown in FIG. 5 to provide the seal heretofore discussed. The crimp applied over the spring fingers 46 is controlled to deform such fingers inwardly as indicated in FIG. 9 by the dotted line. This serves to drive the fingers inwardly to compress the sodium within the fingers and to load the fingers under a spring force tending to restore the fingers to the relaxed configuration. In other words after crimping the fingers are biased outward under a spring force acting against portions of sodium in between the outside of the fingers and the inner surface of the jacket J. This serves to increase the force of engagement of the conductive surfaces of 40 with the conductive material C. Furthermore, a block or mass of conductive material C is entrapped in the forward portion of 44 by the reduced diameter of the ends of the fingers 46 deformed inwardly around the periphery by the controlled crimp of 50 thereover.

In the embodiment of FIG. 10 an alternative form of the terminal is shown as 52 having a sleeve portion 53 constructed similarly to that of the embodiment of FIG. 8 with respect to the conductive portions. In the embodiment of FIG. 10, however, the spring fingers shown as 54 are made to include cutting or biting edges which may be as shown in FIGS. 11 and 12, by the numerals 56 and 58. It is contemplated that depending upon the cable of use and the diameter of sleeve 53 the fingers all may contain cutting edges such as 56 which are beveled outwardly. This results in the fingers being driven inwardly as the terminal is axially inserted into C to be spring loaded to the position shown by the dotted line in FIG. 11. In an alternative embodiment the fingers may be beveled inwardly as indicated in FIG. 12 by the numeral 58 which will result in the fingers being deformed outwardly as indicated by the dotted line. In either case the fingers will be spring loaded by the axial insertion of the terminal assembly onto the cable to maintain a permanent and residual force driving the conductive surfaces of the fingers against portions of the conductive material C. It is contemplated that alternate fingers 54 may be made as shown in FIG. 11 with the other fingers being made as shown in 58 to result in a spring loading both inwardly and outwardly within the mass of conductive material C. It will be noted that in the embodiment of FIG. 10 the ferrule shown as 60 is made to be of a length and to be positioned to overlie the solid portion of 53 and to therefore not compress or drive the fingers inwardly.

The embodiments of FIGS. 8 and 10 both provide residual spring pressure holding the conductive portions of the terminal in spring engagement with the conductive portions of the cable to facilitate an increase in the area of engagement and amalgamation which may occur with the sodium-like alloy and maintain the interface defining the connection.

In FIG. 13 there is shown a conductive part for a terminal assembly of the type shown in FIGS. 4 and 5. The plastic housing and ferrule have been left off but would be as described relative to FIGS. 4 and 5. The terminal conductive element is shown at 62 to include a forward portion 64 for contacting the equipment served by the cable of use joined to an end portion 65 and a sleeve portion 66 which may be formed as indicated relative to the embodiment of FIG. 4. The leading edges of 66 include beveled cutting surfaces extending therearound. The inner portion of 66 is made to contain a spring member shown as 67. The spring member included in the embodiment is made to have relatively low spring force so as to be compressed upon insertion of the device into the cable of use and to remain compressed throughout the life of the cable without tending to extrude or drive the soft conductive material out of the sleeve 66. Fitted over the end of the spring member 67 is a cap 68 which has a rounded forward face and sidewalls to substantially seal against the passage of the conductive material thereby. Portions of the cap may contain spring fingers 69 as shown to frictionally engage the inner walls of 66 and assure a contact path between 68 and the structure of 66. When the device 66 is inserted into the end of cut cable and forced therein to the position shown relative to FIG. 4 the conductive material will compress the spring resulting in the member 68 being held in intimate engagement with the conductive material. The forward face of 68 may be roughened so as to provide a more intimate engagement with the conductive material, if desired.

In FIG. 14 there is shown a splice embodiment 74 for joining cable 70 and 72. The splice 74 includes an outer insulating and plastic tubular member 76 having an inner bore 78 to receive the cable and having in the center thereof a projecting inner flange shown as 80 which serves to hold a conductive sleeve 82 within 76. The conductive sleeve 82 includes identical outward sleeve portions such as 84 shown to the right having leading and cutting edges 86. In the center thereof there is a portion 88 relieved as indicated to be snapped into engagement with the portion 80 of 76. The sleeve portions 84 are of diameters and construction similar to that described with respect to FIG. 4 and are joined in the middle as at 89. With the embodiment of FIG. 14 there is no interface between the conductive materials C of the cables 70 and 72. The connection being through the conductive portions of 82. Fitted over the outside of 76 on each side thereof is a ferrule 90 made in accordance with the description relative to FIG. 4. In use the cables are inserted into 74 and then the ferrules such as 90 are crimped to the configuration shown in FIG. 15 to effect a mechanical and electrical connection of the cables which is sealed. FIG. 16 shows an embodiment in a splice 100 which achieves an interconnection of the cable conductive materials C directly without the imposition of a separate stable conductive material portion. The splice 100 includes an outer insulating and plastic sleeve 102 having in the center thereof a projection shown as 104 which holds and secures a conductive sleeve within an inner bore 106 of 102. The sleeve shown as 108 is thin walled and includes beveled cutting edges and is generally dimensioned and of a configuration to achieve the function heretofore described with respect to FIG. 8 in its engagement and use with cables. The splice 100 includes an outer ferrule 112 which extends continuously over the two ends of the sleeve 108. In the center of 112 the assembly is staked as at 114 to lock the various parts together for ease of handling, shipping and the like. FIG. 17 shows the splice 100 installed on cable and crimped to effect the electrical and mechanical sealed connection of cables. Note that outboard crimps have compressed and driven the materials C together in the center of the splice.

FIG. 18 shows a T-tap embodiment 120 which includes an outer insulating body 122 having sleeve portions to accommodate an inner conductive tubular portion shown as 124. The sleeve portions of 124 are made in accordance with the embodiment of FIG. 8 and the ferrules thereshown as 126 are positioned such that when crimped there is a compression of the conductive material to form an interface between the three cables.

FIGS. 19–21 show a splice embodiment 130 which includes an outer insulating body 132 having sleeve portions 134 beveled at the ends as at 136 to facilitate movement of a ferrule 138 applied to each end over portions 134. The center of body 132 is enlarged as at 140 to limit movement of the ferrules to the position shown in FIG. 21. An annular series of grooves 142 are provided to facilitate holding the body relative to the ferrules which are preferably axially driven over the sleeves 134 after the cable jacket J has been forced within the body. Reference is made to copending application Ser. No. 587,944 filed Oct. 18, 1966, in the name of H. W. Demler, Sr. et al., now abandoned, for a teaching of a preferred technique for accomplishing this. The interior of 132 includes a bore 144 at each end terminated in an inward step 146 which serves to limit and position a metallic insert 150 fitted within 132. The diameter of 144 is made so as to receive jacket J in a sliding fit prior to placement of the ferrule over 134. The insert 150 includes sleeve portions 152 at each end each beveled as at 154 to bite into the material C of the cable as the cable is inserted within 132. A series of annular grooves 156 are provided on 152 to better grip the material of J as indicated in FIG. 21.

The insert 150 includes a flange 158 of a diameter to engage 146 and properly position the insert within 132. The center portion 160 of the insert includes a series of apertures 162 symmetrically disposed around the periphery, four being shown in the exemplary embodiment, which serve to receive the material of C extruded by reason of insertion of the volume of 152 into the cable ends. This prevents undue pressure buildup of C and any resulting leakage of the material. It also tends to assure the presence of sufficient material in the area of interface between materials of the two cable ends.

In accordance with the invention the ferrules 138 are of relatively rigid metallic construction and are not crimped as in previously discussed embodiments. A clamp is provided of the material of sleeves 134 locking and sealing against the material of jacket J.

In the foregoing description a number of distinctively different embodiments have been presented. These various embodiments have a common objective in the respect of providing an interconnection of electrical cable which has a soft and ductile conductive material. They are common in the respect that they all provide a sealing for use with cable which has a conductive material which is unstable in normal environments. Certain of the embodiments provide a residual spring pressure to define a contact with the cable and some of them do not. The embodiments are preferred depending upon the particular application of use including the characteristics of the cable, the conditions under which the various devices must be used, such as the expected temperature range and various other manufacturing and cost factors which may make one embodiment more preferable for a given application than another embodiment. The various embodiments are thus presented as a preferred use of the invention for various applications wherein it may be necessary to trade off one factor such as cost against another factor such as performance.

Having now disclosed and described the invention in terms intended to enable its preferred practice the invention is defined as set forth in the following claims.

What is claimed is:

1. A device for connecting electrical cable of the type having a conductive material of the characteristics of sodium carried in a jacket of insulating material comprising connecting means of a stable conductive material insertable into the cable conductor material including a first portion having a surface area at least as great as the cross-sectional area of the cable conductive material, said first portion having a geometry capable of being axially forced into the cable conductive material by hand, a second portion joined to said first portion for connection with a further electrical conductive path, housing means secured to said connecting means between said first and second portions and including a sleeve portion having an inner diameter to fit over said cable jacket and extend over said first portion as inserted in said cable conductive material, said housing means being of a material inert relative to said conductive material of the cable and means to force said housing against the cable jacket to seal the connection of the said first portion with the conductive material of the cable and from said section portion and the environment of use of said device, the said first portion of said connecting means including at least one spring member extending therealong and positioned to be loaded upon insertion of said first portion in said conductive material to provide a residual spring force holding said portion in engagement with said conductive material.

2. The device of claim 1 wherein said first portion is tubular in shape and includes an open end to accommodate a volume of said conductive material.

3. The device of claim 1 wherein the spring member provides at least a part of the surface of the first portion which is in engagement with the conductive material under said spring force.

4. The device of claim 3 wherein the said spring means is positioned to be radially loaded upon insertion of said first portion into said conductive material.

5. The device of claim 3 wherein the said spring means is positioned to be axially loaded upon insertion of said first portion into said conductive material.

6. The device of claim 1 wherein the spring member is cooperable with means for forcing said housing against the cable jacket, for being loaded radially to provide said spring force.

7. The device of claim 1 wherein the said means to force said housing against said cable is comprised of a ferrule member fitted over the outside of said housing and sufficiently malleable to be crimped inwardly and the said first portion includes a further portion sufficiently rigid to offer substantial resistance to the crimping of said ferrule whereby to compress portions of said jacket between said ferrule and said further portion of said first portion.

8. The device of claim 1 wherein said first portion, said housing and said means to force said housing have aligned portions of a circular cross-section.

9. The device of claim 1 wherein said first portion has an outer diameter slightly smaller than the diameter of the conductive material of said cable whereby to reduce the displacement necessary for operation of said means to force the said housing against the cable jacket.

10. A device for connecting cable having a conductive material of characteristics like that of sodium, a housing of insulating material inert relative to the cable conductive material, said housing including a bore and ferrule means thereon, a tubular insert of conductive material carried in said bore and positioned beneath said ferrule means, said insert having a relatively thin wall section and an end shaped to bite into said conductive material to facilitate axial insertion of said insert into said conductive material with said housing and ferrule extending over the outside of said cable, the said insert including a portion adapted to permit said ferrule to be crimped inwardly against said housing and said insert to seal the connection between said insert and conductive material, the said insert including one or more spring fingers adapted to be deformed inwardly by said ferrule means to provide a residual spring force outwardly against portions of said conductive material.

11. The device of claim 10 wherein said insert includes an integral extension and said housing includes a transverse wall with said extension passing through said wall to provide a terminal for said cable.

12. The device of claim 10 wherein said one or more fingers adapted to be deformed inwardly by said ferrule is operable to entrap a body of said conductive material within said insert to maintain contact with said material.

13. The device of claim 10 wherein said insert is open at each end and each end includes one or more fingers adapted to be deformed inwardly by said ferrule to force conductive material from at least two cables into said insert and in contact therewith.

14. The device of claim 13 wherein said insert is hollow therethrough and said fingers are effective to force the conductive material of two cables together.

15. A connector for cable having a conductor of relatively soft material having flow characteristics of sodium and an outer protective jacket of thermo-plastic material, including a housing of thermo-plastic material having a bore to receive the cable jacket inserted therein, a metallic tubular member carried by said housing and inserted into said conductive material within said jacket and the portion of the housing extending thereover, a ferrule separated from said tubular member by said housing and dimensioned to be axially forced over said housing to deform and compress said housing and said jacket inwardly around said tubular member whereby to provide a gripping and sealing engagement of said housing and said jacket between said ferrule and said member.

16. The device of claim 15 wherein said member includes recesses therein defining a reservoir for said conductor material as extruded by insertion of said member in said cable.

17. The device of claim 16 wherein said recesses extend through the walls of said member and are symmetrically arranged around the periphery thereof.

References Cited

UNITED STATES PATENTS

| | | | |
|---|---|---|---|
| 1,509,224 | 9/1924 | Berthold | 339—100 |
| 1,699,825 | 1/1929 | Waltz | 339—100 X |
| 2,316,267 | 4/1943 | McLarn | 174—84.1 |
| 2,560,643 | 7/1951 | Hallock | 85—13 |
| 3,049,042 | 8/1962 | DeLynn | 85—13 |
| 3,346,690 | 10/1967 | McNerney | 174—77 |
| 3,347,977 | 10/1967 | Hus et al. | 174—74 |

FOREIGN PATENTS 778,669    7/1957    Great Britain.

OTHER REFERENCES

Koning, T. L., The Cooling of Electric Machines and Cables, published 1957 by author, Library of Congress catalog card No. 57–14783, pages 217, 218 and 230 relied on.

LARAMIE E. ASKIN, Primary Examiner

U.S. Cl. X.R.

174—84; 339—100